Feb. 5, 1935.  F. M. HOBEN  1,989,803
RADIOGRAPHIC ILLUMINATOR
Filed Sept. 29, 1933   2 Sheets-Sheet 1
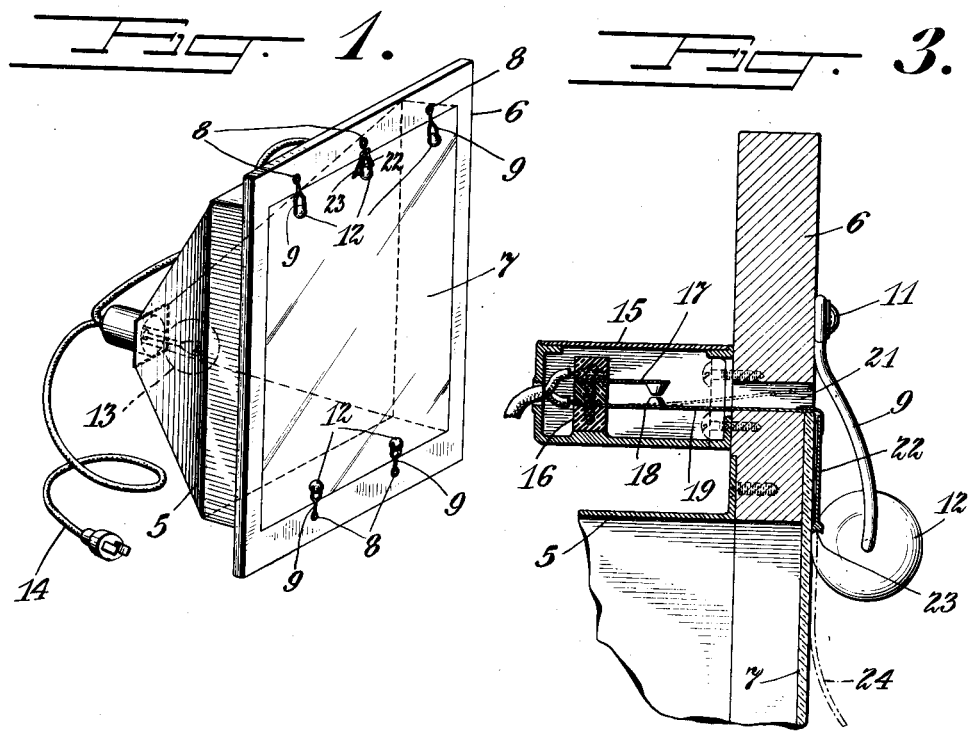
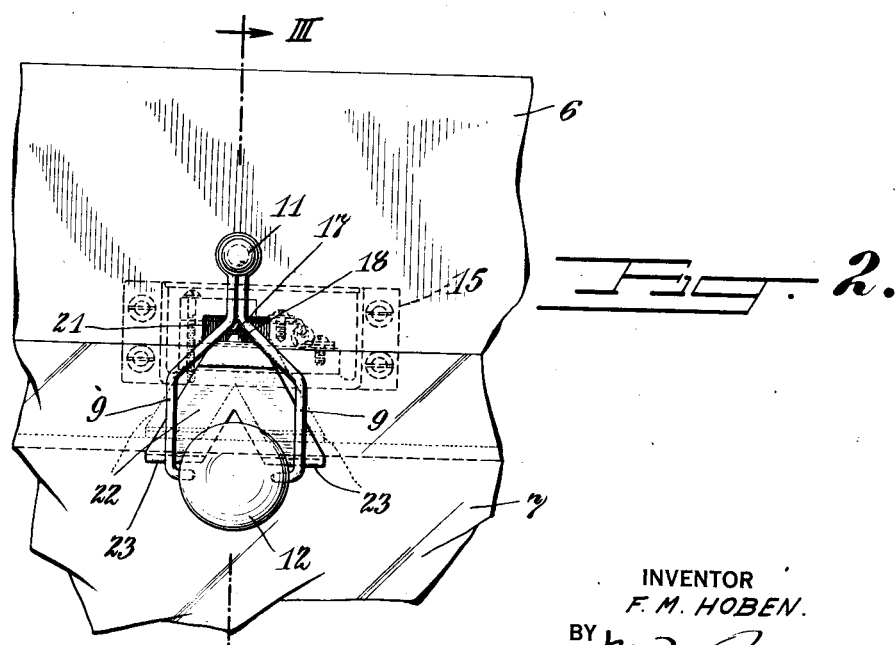
INVENTOR
F. M. HOBEN.
BY
ATTORNEY Feb. 5, 1935.  F. M. HOBEN  1,989,803
RADIOGRAPHIC ILLUMINATOR
Filed Sept. 29, 1933  2 Sheets-Sheet 2
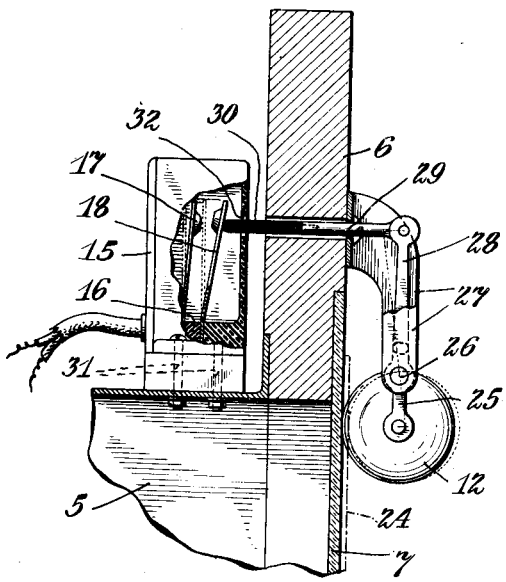
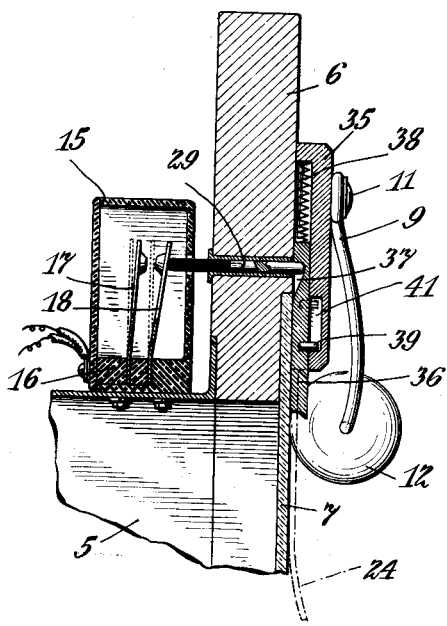
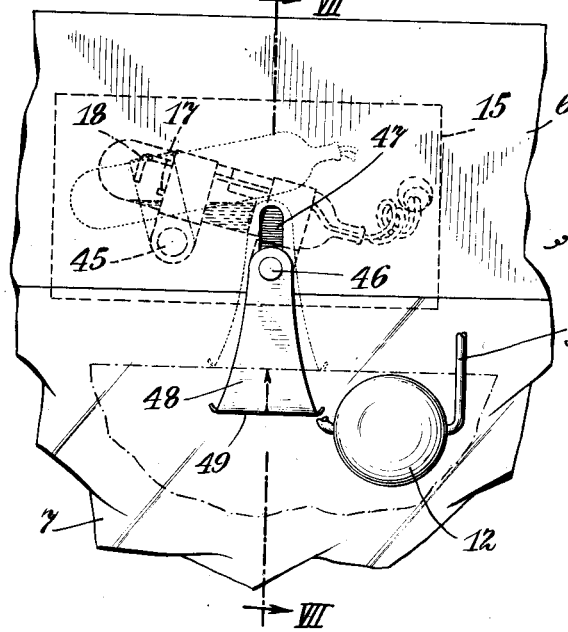
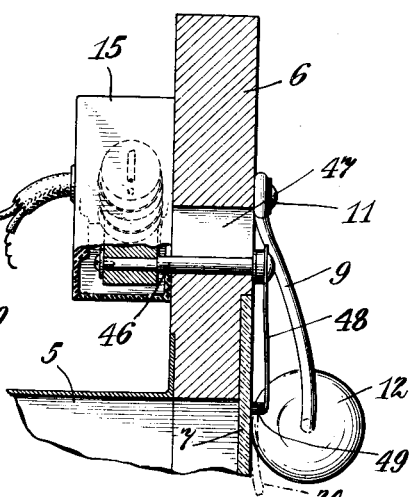
INVENTOR
F. M. HOBEN.
BY
ATTORNEY Patented Feb. 5, 1935

1,989,803

UNITED STATES PATENT OFFICE 1,989,803

RADIOGRAPHIC ILLUMINATOR

Francis M. Hoben, Jackson Heights, N. Y., assignor to Westinghouse X-Ray Company, Inc., a corporation of Delaware Application September 29, 1933, Serial No. 691,516

4 Claims. (Cl. 40—132)

My invention relates to radiographic illuminators or viewing boxes commonly utilized by the Roentgenologist in the diagnostic study of X-ray films and has particular reference to a device of this general character in which the illumination therefor is controlled by the insertion and removal of an X-ray film from in front of said device.

Heretofore in the art such devices have been provided in which the source of illumination thereof is manually controlled by the operator. In the employment of such devices the usual procedure is to illuminate the source prior to the insertion of an X-ray film in front of the device, but not infrequently after completion of the diagnostic study of a particular film the operator fails to extinguish the source of illumination when the device is not actually in use. This tends to not only shorten the useful lift of the electric lamp employed as the source of illumination but likewise unnecessarily causes the consumption of electric energy without any useful purpose.

Moreover, the translucent window employed in devices of this general character usually consists of a glass window having a bluish tint so that the illumination immediately in back of the film more closely simulates daylight. When such devices remain illuminated, although not in actual use, in the room normally utilized by the Roentgenologist for his diagnostic study they invariably cause eye fatigue.

It is accordingly an object of my invention to provide a radiographic illuminator in which the source of illumination therefor is controlled by the insertion and removal of an X-ray film from in front of such device.

Another object of my invention is the provision of a radiographic illuminator wherein the source of illumination therefor is extinguished upon the removal of an X-ray film therefrom thus tending to prolong the useful life of the usual incandescent lamp employed as the source of illumination.

Another object of my invention is the provision of a radiographic illuminator in which the consumption of current for illuminating the device is materially lessened due to the extinguishment of the source of illumination upon the removal of a film therefrom.

A still further object of my invention is the provision of a radiographic illuminator in which the energization and deenergization of the source of illumination is automatically controlled by the insertion and removal of an X-ray film from such device thus eliminating possibilities of eye fatigue resulting from continued illumination of the device when not in actual use for the purposes of diagnostic study.

Still further objects of my invention will become apparent to those skilled in the art by reference to the accompanying drawings wherein, Figure 1 is a perspective view of a radiographic illuminator employing the novel features of my present invention;

Fig. 2 is a fragmentary view on an enlarged scale taken from the front of my device shown in Fig. 1;

Fig. 3 is a sectional view taken on the line III—III of Fig. 2;

Fig. 4 is a sectional view of a modification of the structure shown in Fig. 3;

Fig. 5 is another modification of the switch employed with my radiographic illuminator;

Fig. 6 is a fragmentary view on an enlarged scale taken from the front of my device showing still another modification of a switch employed in my device; and Fig. 7 is a sectional view taken on the line VII—VII of Fig. 6.

Referring now to the drawings in detail I have shown a radiographic illuminator comprising a casing 5 having a flanged front 6 forming a rectangular border adapted to support a translucent window 7 of the usual type of glass normally employed with devices of this character. Secured to the flanged portion 6 of the casing are a plurality of spring pressed clips or retaining members 8. These members may comprise a bifurcated member 9 of a suitable material which is rigidly secured by any suitable means, such as screws or pivots 11 to the flanged portion 6 of the casing. These arms or members 9 are of a material having a slight potential energy in the form of a spring and at the extremities of their bifurcated portions are provided with rollers 12 pivoted thereto. An X-ray film (not shown) is adapted to be inserted between these retaining members 8 and the translucent window 7 by the Roentgenologist first inserting the film under the upper retaining members and then moving the film slightly downwardly in order that the latter may engage the lower retaining members or spring clips.

A source of illumination, such as an incandescent lamp 13, is disposed interiorly of the casing 5 and is adapted to be connected to the usual source of electric energy by means of a flexible cable 14. A small housing 15 is carried by the casing 5 rearwardly of the flange portion 6 and is provided with a suitable insulating block 16 to which is secured a pair of contact terminals 17 and 18.

One of these terminals is connected directly to the socket supporting the incandescent lamp 13 and the other contact terminal is connected to one of the conductors adapted to be connected to the source of electrical energy, thus making these contact terminals in electric series relationship relative to the lamp 13 and its source of electrical energy.

One of these contact terminals is provided with an elongated arm 19 which extends through an opening 21 in the flanged portion 6 of the casing and extends angularly downward in bifurcated form, as at 22 (Fig. 2), with the extremity thereof normally positioned substantially in alignment with the extremities of the bifurcated portion 9 of the retaining members 8. The extremity of the angularly disposed portion 22 of this arm is enlarged and provided with a slight concavity, as at 23, in order that an X-ray film, shown in dot and dash lines as at 24, may be positioned between the rollers 12 and the translucent window 7. The film will accordingly engage the concavity 23 and move the portion 22, together with the arm 19, upwardly as shown in dotted lines in this figure thus establishing contact of the respective contact terminals 17 and 18. Closure of these contact members accordingly completes the circuit from the source of electrical energy to the source of illumination or incandescent lamp 13, thus illuminating the viewing box. Upon completion of the examination of the X-ray film by the Roentgenologist and removal of the film from the device, the arm 19 together with the angularly disposed portion 22 will again assume its normal position as shown in full lines in Figure 3 due to the resilience of the elongated arm 19 which functions in the manner of a leaf spring.

In Figure 4 I have shown a modification of the device just described in that one of the retaining members or spring clips 8 constitutes the switch operable to cause energization and de-energization of the source of illumination 13. In this figure the roller 12 is likewise pivotally secured to a bifurcated member 25 which in turn is pivotally secured at 26 to a pair of angular brackets 27 rigidly affixed to the front of the flange portion 6 of the casing. The bifurcated portion 25 has an elongated arm 28 which extends upwardly between the brackets 27 and its upper extremity has pivotally secured thereto a plunger 29 extending laterally through an opening provided in the flange portion 6 thus forming substantially a bell crank lever with the end of this plunger composed of suitable insulating material 30.

In this modification the casing 15 is secured in any suitable manner, such as by screws 31 to the casing 5 and is provided with an opening 32 through which the insulated portion 30 of the plunger extends. Contact members 17 and 18 are so disposed within the casing that one of these contact terminals 18 is contacted by the insulated portion 30 of the plunger to cause closure of these contact terminals. Accordingly upon the insertion and removal of an X-ray film 24 the roller 12 together with its bifurcated portion 25 is rotated about its pivot 26, thus causing movement of the bell crank lever formed by the portions 25, 28 and plunger 29, to the left and right, respectively, as shown in Figure 4, with lateral reciprocatory movement of the plunger 29 together with its insulated end 30.

When a film is inserted the contact terminal 18 will be moved to the left as shown in dotted lines in this figure, thus establishing connection with the contact terminal 17. These terminals being connected respectively to the source of illumination and the source of electrical energy, as previously described, will complete the circuit and cause energization of the incandescent lamp 13. Again after completion of the examination by the Roentgenologist and his removal of the X-ray film from the device the inertia of the roller and bell crank lever aided by the spring action of the contact terminals 17 and 18 exerted upon the plunger 29 will cause the roller to assume its normal position in contact with the translucent window 7, thus opening the contact terminals 17 and 18 and extinguishing the source of illumination or incandescent lamp 13.

In Figure 5 I have shown still another modification of the switch as shown in Figure 4, the same may be identical with the structure shown in Figure 4 with the exception that the plunger 29 is not pivotally connected to a bell crank mechanism which forms part of the spring pressed clip or retaining member 8, but is separated therefrom.

In this particular structure I provide a small housing 35 affixed to the front of the flange portion 6. This housing is provided with an open slot at the bottom thereof in proximity to the rollers 12 and a member 36 is arranged to slidably move in the opening provided between the housing 35 and the translucent window 7. The movable member 36 is provided with a tapering slot 37 in which the plunger 29 is recessed when the movable member 36 is in its normal position.

A small coil spring 38 applies a tension to the movable member 36 for the purpose of retaining it in its normal position and it is prevented from becoming disengaged with the housing 35 by the engagement of the plunger 29 therewith as well as by the provision of a small pin 39 extending laterally in an elongated slot 41 provided interiorly of the housing 35. Upon the insertion of the X-ray film 24 between the rollers 12 and the translucent window 7 the same contacts the movable member 36 and moves the same upwardly against the slight tension exerted by the coil spring 38. The tapering slot 38 accordingly forces the plunger 29 to the left, as shown in this figure, and again causes closure of the respective contact terminals 17 and 18 in the same manner as just described relative to Figure 4.

Upon removal of the film from the device the movable member 36 is again returned to its normal position by the force exerted by the spring 38 and the plunger 29 is likewise returned to its recessed position in the slot 37 by the slight tension exerted by the contact terminals 17 and 18.

In Figures 6 and 7 I have shown a still further modification of my device in that I employ a mercury switch for causing energization of the source of illumination from the source of electrical energy therefor. In this modification the sealed envelope of the switch is pivoted as at 45 interiorly of the housing 15 provided on the rear side of the flange portion 6 of the casing 5. This pivot point is disposed toward one end of the sealed envelope in order that the same is normally off center with the usual contact terminal disposed within the sealed envelope in an open position due to the metallic fluid, such as mercury, being at the opposite end of the envelope.

For the purpose of tilting the sealed envelope about its pivot 45 to cause the flow of the metallic fluid toward the other end and the establishment of an electrical contact between the usual contact terminals provided therein, I operably connect a pin 46 to the envelope of the switch. This pin 46 extends through an elongated opening 47 provided in the flange portion 6 of the casing and at its opposite extremity it is provided with a downwardly extending portion 48 which flares slightly outward and at its lower extremity is bent inward as at 49. The extremity 49 of this member 48 is again disposed substantially in alignment with the axis upon which the roller 12 rotates so that the member 48 will be contacted by an X-ray film when inserted between the roller 12 and the translucent window 7. The insertion of the film will cause upward movement of the arm 48 together with the pin 46 and, as this latter is connected to the sealed envelope of the mercury switch, the same will be rotated about its pivot 45 thus causing flow of the metallic fluid to the end of the envelope in which the contact terminals 17 and 18 are disposed. This again completes the electrical circuit and causes energization of the source of illumination. After completion of the examination by the Roentgenologist and the removal from the viewing box of the film, the members 46 and 48 will be returned to their normal position due to the inertia of the mercury switch. Because the same is pivoted slightly off center as before noted, the weight thereof will cause rotation about the pivot 45 so that the switch assumes its normal or a circuit opening position. This action, therefore, again extinguishes the source of illumination for the viewing box.

It should be understood that although I have shown various modifications of the structure of the switch utilized in my novel viewing box or radiographic illuminator, the same is susceptible to still further modifications and even more simple construction and that the forms herein shown and described are to be taken as illustrative only with my invention being limited only by the scope of the appended claims. Moreover, throughout my specification and claims I have referred to a closing and opening of the circuit by operation of the switching means upon the insertion and removal of an X-ray film, but the broad aspects of my invention are applicable to what is termed in the electrical art as a closed circuit. In other words the normal position of the switch contacts may be a closed one with the source of illumination nevertheless extinguished and upon the insertion of a film these contacts may be opened with a resulting energization of the source of illumination. This type of circuit being well known in the electrical art need not be specifically shown nor described but is within the contemplation of my claims.

It thus becomes obvious to those skilled in the art that I have provided a radiographic illuminator in which energization and de-energization of the source of illumination therefor is automatically controlled by the insertion and removal of an X-ray film from in front of the translucent window. Inasmuch as the source of illumination is extinguished when the device is not in actual use for diagnostic purposes the life of the incandescent lamp is appreciably prolonged, the consumption of electrical energy is considerably diminished, and the possibilities of eye fatigue resulting to the Roentgenologist is entirely eliminated because the device is not illuminated when not actually employed by the Roentgenologist.

What is claimed is:

1. A radiograph illuminator for examining X-ray films comprising an opaque casing, a translucent window provided in said casing, a source of illumination in said casing and adapted to be energized from a source of electrical energy, and a switch carried by said casing electrically connected to said source of electrical energy and said source of illumination and provided with a movable arm operable by the insertion and removal of an X-ray film from in front of said translucent window to cause closure of said switch with attendant energization and de-energization of said source of illumination.

2. A radiograph illuminator for examining X-ray films comprising an opaque casing, a translucent window provided in said casing, a source of illumination in said casing and adapted to be energized from a source of electrical energy, and a switch carried by said casing adjacent said translucent window comprising a pair of normally open contact members connected to said source of illumination and the source of electrical energy therefor, one of said contact members having a resilient arm adapted to be contacted by an X-ray film when positioned in front of said translucent window to cause closure of said contact members with attendant energization of said source of illumination.

3. A radiograph illuminator for examining X-ray films comprising an opaque casing, a translucent window provided in said casing, a source of illumination in said casing and adapted to be energized from a source of electrical energy, a plurality of retaining members carried by said casing adjacent said translucent window for holding an X-ray film in position in front of said translucent window, one of said retaining members having a roller adapted to be engaged by said X-ray film and provided with a pivoted bell crank lever affixed thereto and reciprocally movable upon the insertion and removal of an X-ray film, and a switch carried by said casing comprising a pair of normally open contact members connected to said source of illumination and the source of electrical energy therefor, and operable by the reciprocatory movement of the bell crank lever affixed to said retaining member to cause closure thereof with attendant energization of said source of illumination.

4. A radiograph illuminator for examining X-ray films comprising an opaque casing, a translucent window provided in said casing, a source of illumination in said casing and adapted to be energized from a source of electrical energy, and a switch carried by said casing and operable upon the insertion and removal of an X-ray film from in front of said translucent window to cause energization and de-energization of said source of illumination comprising a pivoted sealed envelope having a pair of terminals therein connected to said source of illumination and a source of electrical energy therefor, and provided with a metallic fluid adapted to establish an electrical contact with said terminals when said envelope is rotated about its pivot in one position, and an angularly disposed arm operably engaging said envelope and adapted to be contacted by an X-ray film to cause rotation of said envelope about its pivot with the establishment of electrical contact between said terminals by said metallic fluid and attendant energization of said source of illumination.

FRANCIS M. HOBEN.